United States Patent Office 3,642,715
Patented Feb. 15, 1972

3,642,715
PROCESS FOR THE PREPARATION OF
AROMATIC POLYAMIDES
Pierre Allard, Cailloux-sur-Fontaines, France, assignor to
Societe Rhodiaceta, Paris, France
No Drawing. Filed May 21, 1969, Ser. No. 826,664
Claims priority, application France, May 22, 1968,
50,045
Int. Cl. C08g 20/20, 51/44
U.S. Cl. 260—78 R
15 Claims

ABSTRACT OF THE DISCLOSURE

The invention relates to a process for the preparation of solutions of aromatic polyamides which comprises reacting one or more dicarboxylic acids with one or more diisocyanates, at least one of which is aromatic, in a polar liquid at a temperature which is raised progressively from a lower temperature superior to ambient to a higher temperature of 120° to 250° C.

---

The present invention relates to a process for the preparation of aromatic polyamides of high molecular weight which can, for example be drawn into filaments, shaped into films, and used in the preparation of coatings, and varnishes.

The majority of polyamides containing aromatic residues cannot be prepared by conventional methods of bulk polycondensation because their melting points are very high and close to their decomposition point. Various processes for producing them in heterogeneous or homogeneous liquid phase reactions have been proposed, for example, by reacting a diacid dichloride with a diamine. This reaction can either be effected at the interface of two immiscible liquids, each containing one of the reagents, under conditions such that the polymer precipitates or remains in the reaction medium and swollen by it, or in a medium which is a solvent for the two reagents, this medium at the same time being a swelling agent or solvent for the resulting polymer.

Such prior art processes suffer from the disadvantages of producing polymer dispersions or solutions which retain the hydrochloric acid produced in the polycondensation. Because of this, these compositions can not be directly used in forming shaped articles and, accordingly it is necessary to purify the polymer by removing the hydrochloric acid.

The present invention provides polymer solutions which do not have to be purified before use in forming shaped articles.

According to the present invention, there is provided a process for the preparation of solutions of aromatic polyamides whose structures consist of repeated units of the general formula:

in which the radicals R and R' (which may the same or different) are divalent, substituted or unsubstituted organic radicals at least one of which is aromatic, which comprises reacting, in substantially stoichiometric amounts (as hereinafter defined), one or more diacids of the general formula:

with one or more diisocyanates of the general formula:

in a polar liquid at a temperature which is raised progressively from a lower temperature superior to ambient to a higher temperature of 120° to 250° C.

"Substantially stoichiometric amount" in this specification means that a molar ratio of diacid/diisocyanate from 0.90 to 1.10 is employed.

According to the present invention, R and/or R' may be substituted or unsubstituted phenylene radicals, divalent, substituted or unsubstituted aromatic polycyclic radicals or divalent radicals consisting of several substituted or unsubstituted phenylene radicals linked by one or more divalent atoms or groups, for example, —O—, —SO$_2$—, —CO—, alkylene, cycloalkylene, arylene, or heterocyclic residues.

Among the aromatic diacids, terephthalic acid, isophthalic acid, and 4,4'-dicarboxydiphenylsulphone are preferably used; among the aromatic diisocyanates metaphenylene diisocyanate, 4,4'-diisocyanato-diphenylmethane, 2,2-bis-(4-isocyanatophenyl) propane are preferably used. Among the aliphatic diacids, adipic and sebacic acid are preferably used; among the aliphatic or cycloaliphatic diisocyanates hexamethylene-1,6-diisocyanate, bis-(isocyanatocyclohexyl)methane and 3,9-bis-(3-isocyanatopropyl)-2,4,8,10-tetroxa-(5,5)-spiro-undecane are preferably used.

Branched polymers can be obtained by introducing into the reaction mixture a small percentage, relative to the diisocyanate, of a triisocyanate such as tris-(4-isocyanatophenyl)methane, tris-(4 - isocyanatophenyl)phosphate or tris-(4-isocyanatophenyl)thiophosphate, or of a polyisocyanate such as polyisocyanatopolyphenylenepolymethylene.

As the liquid medium, a polar liquid such as linear or cyclic amides or phosphoramides, for example, N,N-dimethylformamide, N,N-dimethylacetamide, N-methylpyrrolidone or hexamethylphosphoryltriamide, or sulphones, for example, tetramethylenesulphone, are used. The liquid medium may contain a certain proportion of polymer solvents, which are inert towards the reagents under the reaction conditions, such as xylene or toluene, and additives such as hydrogen bond breaking agents, for example, LiCl and CaCl$_2$.

The reagents are preferably mixed at ambient temperature; they may be dissolved in the liquid either simultaneously or successively or may be dissolved separately and the two or more solutions then mixed. In certain cases, one or more of the diacids may be insoluble at ambient temperature in the solvent used.

During the reaction, the rate of temperature rise preferably ranges from 0.16° C. to 1.0° C. per minute, this rise being either continuous or effected in discrete stages. To obtain high degrees of polymerisation, it may be necessary, in certain cases, to finish the process with heating at a constant temperature between 120° C. and the boiling point of the solution or dispersion for a period of 1 to 8 hours.

The reaction medium may be kept under reduced pressure so as to favour the evolution of CO$_2$, which for convenience, is approximately the saturated vapour pressure of the solvent used at the various reaction temperatures employed.

During the reaction vigorous stirring is maintained to ensure homogeneous heating which is essential for the reaction to follow a satisfactory course.

If all the reagents used are aromatic, the concentration of the reagents can influence the course of the reaction; a reagent concentration between 5 and 50% by weight and preferably between 10 and 40% by weight will generally be chosen at the beginning of the reaction, the choice of this concentration being determined by the reactivity of the starting products and the degree of solubility of the polymer in the reaction medium.

In order to obtain high degrees of polymerisation and to ensure that the stirring remains efficient, it is desirable that the viscosity of the reaction medium does not rise above 1,000 poises at the reaction temperature; in order to maintain it below this value, further quantities of polar liquid are added either continuously or discontinuously during the reaction.

The following examples illustrate the invention. In these examples, the inherent viscosity of the polymers was measured on a 0.5% strength solution in N-methylpyrrolidone at 25° C., and all percentages are by weight.

EXAMPLE 1

249 g. of isophthalic acid (1.5 mols), 375 g. of 4,4'-diisocyanatodiphenylmethane (1.5 mols) and 1968 g. of N-methylpyrrolidone were mixed in a four litre glass reactor vessel provided with a reflux condenser and nitrogen inlet and a central, anchor-type, stirrer.

The mixture was heated, with stirring to 50° C. on an oil bath. The temperature was then increased to 200° C., by increases of 10° C. made every 20 minutes. The process was finished by heating for two hours at 200° C., during which time the solution turned slightly brown and its viscosity progressively increased. It was thereafter allowed to cool on the oil bath until it returned to ambient temperature.

The resulting solution was brown, clear and of low viscosity (about 20 poises). As soon as it was decanted crystallisation occurred, though the polymer could be kept in solution by adding 0.5 to 5% of a hydrogen bond breaking agent such as lithium chloride.

The polymer had an inherent viscosity of 0.40.

EXAMPLE 2

210 g. of toluene diisocyanate (1.2 mols) containing 80% of the asymmetric meta-diisocyanate, 199.2 g. of terephthalic acid (1.2 mols) and 705 g. of distilled N-methylpyrrolidone were mixed in a two litre glass reactor vessel provided with a descending condenser connected through a swan-neck, a cold trap containing solid carbon dioxide and acetone, a nitrogen inlet and a central anchor-type stirrer.

The mixture was progressively heated while maintaining a reduced pressure in accordance with the information in Table I. The product remained clear and its viscosity progressively increased; 100 ml. quantities of solvent were added several times. At the end of the heating, the solution became slightly turbid.

TABLE I

| Time | Temperature (° C.) | Pressure (mm. Hg) | Additions of N-methylpyrrolidone (ml.) |
|---|---|---|---|
| 0 | 80 | 50 | |
| 30 minutes | 90 | 50 | |
| 1 hour | 100 | 75 | |
| 1 hour, 30 minutes | 110 | 75 | |
| 2 hours | 120 | 75 | |
| 2 hours, 30 minutes | 130 | 100 | |
| 3 hours | 140 | 125 | |
| 3 hours, 30 minutes | 150 | 125 | 100 |
| 4 hours | 160 | 150 | |
| 4 hours, 30 minutes | 170 | 200 | 100 |
| 5 hours | 180 | 250 | |
| 5 hours, 30 minutes | 190 | 300 | 100 |
| 6 hours | 200 | 400 | |
| 8 hours | 200 | 550 | 1 400 |

1 At the end of the heating.

After 15 hours cooling in air the solution had the following properties:

Solids content, percent _____ 19.0
Viscosity, poises _____ 33
Inherent viscosity of the polymer _____ 0.64

If the mixture was not diluted during the reaction, all other conditions being identical, a gel was obtained which was difficult to handle; on the other hand, if initial dilution was effected polymers of high inherent viscosity were not obtained.

EXAMPLE 3

A poly-toluene isophthalamide was prepared by the same process as in the preceding Example 2 using the same quantities of reagents, and reaction conditions but replacing the terephthalic acid by isophthalic acid. However, the viscosity rose more slowly so that no dilution was effected.

After 15 hours cooling in air, a solution with the following properties was obtained:

Solids content, percent _____ 34.1
Viscosity, poises _____ 68
Inherent viscosity of the polymer _____ 0.26

EXAMPLE 4

Films were prepared from the solutions prepared in Examples 2 and 3.

The solutions were cast on glass plates as an 0.7 mm. thick layer. Two experiments were carried out for each solution. The plates were placed in an oven at 80° C. and progressively heated under a reduced pressure; beyond 115° C. a progressive further reduction in pressure was applied. One film was withdrawn at 140° C., the other was left in the oven, the process being finished by a treatment of 3 hours at 170° C. after which this second film was withdrawn.

The solution of Example 2 yielded pale yellow films which were slightly opalescent, while the solution of Example 3 yielded yellowish-orange films. The appearance of the films is indicated in Table II.

TABLE II

| Reference | Film A (140° C.) | Film B (170° C.) |
|---|---|---|
| Solution (Example 2) | Resists folding | Brittle. |
| Solution (Example 3) | Brittle | Cracked. |

Only the solution of Example 2 produced a satisfactory film because of its high molecular weight.

EXAMPLE 5

263.3 g. of toluene diisocyanate (1.5 mols), containing 80% of the asymmetric meta-diisocyanate (the titration giving 99.1% of —NCO groups compared with theory), 10.5 g. of tris-(isocyanatophenyl)thiophosphate (0.0225 mols) 253 g. of terephthalic acid (1.5 mols) and 1244 g. of N-methylpyrrolidone were mixed in the same apparatus as used in Example 2.

The conditions of reaction were as set out in Table III.

TABLE III

| Time | Temperature (° C.) | Absolute pressure (mm. Hg) | Observations |
|---|---|---|---|
| 0 | 80 | 100 | Solution after 0 hour, 45 minutes. |
| 30 minutes | 90 | 100 | |
| 1 hour | 100 | 100 | |
| 1 hour, 30 minutes | 110 | 100 | |
| 2 hours | 120 | 100 | |
| 2 hours, 30 minutes | 130 | 100 | |
| 3 hours | 140 | 200 | Sample P₁. |
| 3 hours, 30 minutes | 150 | 200 | Sample P₂. |
| 4 hours | 160 | 300 | |
| 4 hours, 30 minutes | 160 | 300 | Heating stopped, sample P₃ then taken. |

The solution was yellow-orange and homogeneous. The samples exhibited the following properties:

TABLE IV

| Sample | Taken after— | Solids content, percent | Viscosity (poises) | Inherent viscosity of the polymer |
|---|---|---|---|---|
| P₁ | ½ hour at 150° C | 24.8 | 380 | 0.47 |
| P₂ | ½ hour at 160° C | 24.6 | 605 | 0.57 |
| P₃ | After returning to ambient temperature. | 25.0 | 770 | 0.65 |

EXAMPLE 6

271 g. of toluene diisocyanate (1.545 mols), (same sample as in Example 5). 10.5 g. of tris-(isocyanatophenyl)thiophosphate (0.0225 mol), 254.6 g. of terephthalic acid (1.5338 mols) and 1422 g. of N-methylpyrrolidone were mixed in the same apparatus as used in Example 2.

The conditions of reaction were as set out in Table V. Since the viscosity of the medium rose very rapidly at 150° C., numerous samples were taken in order to permit sufficient dilution.

TABLE V

| Time | Temperature (° C.) | Absolute pressure (mm. Hg) | Observations |
|---|---|---|---|
| 0 | 80 | 100 | |
| 30 mins | 90 | 100 | |
| 1 hr | 100 | 100 | |
| 1 hr., 30 mins | 110 | 100 | |
| 2 hrs | 120 | 200 | |
| 2 hrs., 30 mins | 130 | 200 | |
| 3 hrs | 140 | 200 | |
| 3 hrs., 30 mins | 150 | 200 | |
| 4 hrs., 15 mins | 150 | 300 | Sample $P_1$. |
| 4 hrs., 30 mins | 150 | 300 | Addition of 100 ml. N-methylpyrrolidone. |
| 4 hrs., 45 mins | 150 | 300 | Addition of 500 ml. N-methylpyrrolidone. |
| 5 hrs | 150 | 300 | Sample $P_2$, addition of 300 ml. of N-methylpyrrolidone. |
| 5 hrs., 30 mins | 150 | 300 | Sample $P_3$. |
| 6 hrs., 30 mins | 150 | 300 | Heating stopped, sample $P_4$ taken. |

The solution was yellowish-orange and homogeneous. The samples exhibited the following properties:

TABLE VI

| Sample | Solids content, percent | Viscosity (poises) | Inherent viscosity of the polymer |
|---|---|---|---|
| $P_1$ | 22.4 | 720 | 0.83 |
| $P_2$ | 16.1 | 1800 | 0.94 |
| $P_3$ | 13.7 | 800 | 1.17 |
| $P_4$ | 13.7 | 130 | 1.09 |

This example shows that excessively prolonged heating can be harmful and can result in a lowering of the viscosity of the polymer obtained.

The glass rod test showed excellent spinnability of the final solution (sample $P_4$).

EXAMPLE 7

361.6 g. of toluene diisocyanate (2.06 mols), containing 80% of the asymmetric meta-diisocyanate, 332 g. of terephthalic acid (2 mols) and 1639 g. of N-methylpyrrolidone were mixed in a 4-litre flask equipped as in Example 2; conditions of pressure and temperature as used in Example 6 were employed and, while maintaining the temperature at 150° C., the rise in viscosity was observed at different dilutions. Heating was interrupted after 3 hours at a temperature of 150° C.

The yellow solution showed the following properties:

Solids content (percent) _____ 18
Viscosity (poises) _____ 1330
Inherent viscosity of the polymer _____ 1.28

EXAMPLE 8

278 g. of 2,2-bis-(4-isocyanatophenyl)propane (1 mol), 166 g. of terephthalic acid (1 mol) and 830 g. of N-methylpyrrolidone were mixed in the same apparatus as used in Example 2; the conditions of reaction used in Example 2 were also employed. 100 ml. of solvent were added to the solution at 130° C., followed by another 100 ml. at 200° C.

The deep brown solution showed the following properties:

Solids content (percent) _____ 27.3
Viscosity (poises) _____ 204
Inherent viscosity of the polymer _____ 0.57

Crystallisation of the polymer took place after standing for one week.

EXAMPLE 9

286.34 g. of 2,2-bis-(4-isocyanatophenyl)propane (1.03 mols), 166 g. of terephthalic acid (1 mol) and 946 g. of N-methylpyrrolidone were mixed in the same apparatus as used in Example 2; the conditions of reaction used in Example 2 were also employed. 100 ml. of solvent were added to the solution at 150° C.

The deep brown solution showed the following properties:

Solids content (percent) _____ 26.8
Viscosity (poises) _____ 375
Inherent viscosity of the polymer _____ 0.71

The infra-red spectrum of the polymer was identical to the spectrum of the polymer obtained by interfacial condensation of terephthaloyl dichloride and 2,2-bis-(4-aminophenyl)propane.

EXAMPLE 10

320 g. of 2,2-bis-(4-isocyanatophenyl)propane (1.15 mols), 166 g. of terephthalic acid (1.00 mol), and 998 g. of N-methylpyrrolidone were mixed in the same apparatus as used in Example 2; the conditions of reaction used in Example 6 were employed. At 140° C. the viscosity of the solution rose to over 10,000 poises, 800 ml. of N-methylpyrrolidone were then added and the heating was stopped. The solution appeared gelatinous. After one week's storage, the viscosity decreased to 100 poises.

This experiment shows that according to the process of the invention, use of too great an excess of diisocyanate gives solutions which cannot be utilised industrially.

EXAMPLE 11

282.4 g. of 2,2-bis-(4-isocyanatophenyl)propane (1 mol), 23.25 g. of tris-(isocyanatophenyl)thiophosphate (0.05 mol), 178.45 g. of terephthalic acid (1.0375 mol) and 1013 g. of N-methylpyrrolidone were mixed in the same apparatus as used in Example 2.

The temperature was progressively raised to 160° C. under a pressure of 100 to 250 mm. Hg. The viscosity rose and then stabilized itself at 330 poises (solids content: 29%).

EXAMPLE 12

136.0 g. of toluene diisocyanate (0.75 mol) containing 80% of the asymmetric meta-diisocyanate, 62.5 g. of 4,4' diisocyanato-diphenylmethane (0.25 mol), 166.0 g. of terephthalic acid (1.0 mol); and 774 g. of N-methylpyrrolidone were mixed in the same apparatus as used in Example 2; the conditions of reaction used in Example 6 were employed. No dilution was effected. After cooling, the yellowish-brown solution showed the following properties:

Solids content (percent) _____ 28.3
Viscosity (poises) _____ 475
Inherent viscosity of the polymer _____ 0.62

A brown, resistant film was prepared by the same process as used in Example 4.

EXAMPLE 13

53.5 g. of toluenediisocyanate (0.3075 mol) containing 65% of the asymmetric meta-diisocyanate, 25.6 g. of 4,4' diisocyanato-diphenylmethane (0.1025 mol), 66.4 g. of terephthalic acid (0.4 mol) and 340 g. of N-methylpyrrolidone were mixed in a one litre reactor vessel provided with a descending condenser connected through a swan-neck, a cold trap containing solid carbon dioxide and acetone, a nitrogen inlet and a central, anchor-type stirrer; the conditions of reaction used in Example 6 were employed; no dilution was effected.

After cooling, the slightly brown solution showed the following properties:

Solids content (percent) _____ 27.0
Viscosity (poises) _____ 418
Inherent viscosity of the polymer _____ 0.65

EXAMPLE 14

227 g. of 2,2-bis-(4-isocyanatophenyl) propane (0.8 mol, the titration giving 98% of expected-NCO groups), 50 g. of 4,4′ diisocyanatodiphenylmethane (0.2 mol), 166 g. of terephthalic acid (1.0 mol), and 915 g. of N-methylpyrrolidone were mixed in the same apparatus as used in Example 2; conditions of pressure and temperature as used in Example 6 were employed; no dilution was effected.

After cooling, the orange-red solution showed the following properties:

Solids content (percent) _____ 28.8
Viscosity (poises) _____ 235
Inherent viscosity of the polymer _____ 0.56

EXAMPLE 15

198.5 g. of 2,2-bis-(4-isocyanatophenyl)-propane (0.7 mol, same sample as in Example 14), 75 g. of 4,4′ diisocyanato-diphenylmethane (0.3 mol), 166 g. of terephthalic acid (1.0 mol), and 904 g. of N-methylpyrrolidone were mixed in the same apparatus as used in Example 2; conditions of pressure and temperature as used in Example 6 were employed; no dilution was effected.

After cooling, the orange-red solution showed the following properties:

Solids content (percent) _____ 29.2
Viscosity (poises) _____ 112
Inherent viscosity of the polymer _____ 0.45

EXAMPLE 16

68.5 g. of meta-phenylenediisocyanate (0.414 mol, the titration giving 96.5% of NCO groups compared to theory), 66.4 g. of isophthalic acid (0.4 mol), and 222 g. of N-methylpyrrolidone were mixed in the same apparatus as in Example 13.

The mixture was progressively heated in the same conditions as used in Example 6; before cooling, 74 g. of solvent were added.

The reddish brown solution showed the following properties:

Solids content (percent) _____ 24.7
Viscosity (poises): crystallisation occurred in the reactor vessel under 80° C.
Inherent viscosity of the polymer _____ 0.42

EXAMPLE 17

161.6 g. of meta-phenylene diisocyanate (1 mol, the titration giving 99% of NCO groups compared to theory), 18.6 g. of tris-(isocyanatophenyl) thiophosphate (0.04 mol), 175.9 g. of isophthalic acid (1.06 mol) and 625 g. of N-methylpyrrolidone, were mixed in the same apparatus as used in Example 2; the mixture was progressively heated in the same conditions as in Example 6. Before cooling, 447 g. of solvent were added to the solution.

The reddish brown solution showed the following properties:

The reddish brown solution showed the following properties:

Solids content (percent) _____ 19.3
Viscosity (poises) _____ 3.0
Inherent viscosity of the polymer _____ 0.45

EXAMPLE 18

282.4 g. of 2,2-bis-(4-isocyanatophenyl) propane (1 mol), 23.26 g. of tris-(isocyanatophenyl) thiophosphate (0.05 mol), 178.45 g. of terephthalic acid (1.0375 mol), and 1013 g. of N,N-dimethylacetamide were mixed in the same apparatus as used in Example 2. The temperature was progressively raised to 160° C. while maintaining a reduced pressure in accordance with the greater volatility of the solvent. The viscosity rose and then stabilised at 40 poises (solids content: 29.5%).

EXAMPLE 19

240.2 g. of 2,2-bis-(4-isocyanatophenyl) propane (0.9 mol), 166 g. of terephthalic acid (1 mol) and 780 g. of N-methylpyrrolidone were mixed in the same apparatus as used in Example 2; the temperature was progressively raised to 150° C. while maintaining a reduced pressure. A solution consisting of 27.8 g. of 2,2 bis-(4-isocyanatophenyl) propane (0.1 mol) and 50 g. of N-methylpyrrolidone was then slowly added under vigorous stirring. After some time, the viscosity rose progressively and then stabilised itself at 320 poises; the inherent viscosity of the polymer was 0.65.

EXAMPLE 20

101.8 g. of meta-phenylenediisocyanate (0.63 mol), 116.2 g. of isophthalic acid (0.7 mol) and 380 g. of N,N-dimethylacetamide were mixed in the same apparatus as used in Example 2, and heated as in Example 19. Some crystallisation occurred over 130° C. At 150° C., were added a solution consisting of 11.3 g. of meta-phenylenediisocyanate and 11.3 g. of N,N-dimethylacetamide, and then 162 g. of N-methylpyrrolidone.

A sample was taken, and the crystallisation disappeared after adding some lithium chloride.

I claim:

1. A process for the preparation of solutions of aromatic polyamides whose structure consists of repeated units of the general formula:

—CO—R—CO—NH—R′—NH— in which the radicals R and R′ (which may be the same or different) are divalent, substituted or unsubstituted aromatic radicals, said process comprising reacting in substantially stoichiometric amounts, one or more diacids of the general formula:

HOOC—R—COOH with one or more diisocyanates of the general formula:

OCN—R′—NCO in polar liquid at a temperature which is raised progressively at a rate of from 0.16° to 1.0° C. per minute from a lower temperature of greater than ambient but below 120° C. to a higher temperature of 120° to 250° C.

2. The process according to claim 1 in which one diacid is reacted with one diisocyanate.

3. The process according to claim 1 in which R and/or R′ are substituted or unsubstituted phenylene radicals; divalent, substituted or unsubstituted aromatic polycyclic radicals; or divalent radicals consisting of several substituted or unsubstituted phenylene radicals linked by one or more of —O—, —SO₂—, —CO—, alkylene, cycloalkylene, arylene or divalent heterocyclic residues.

4. The process according to claim 1 in which the diacid is selected from the group consisting of terephthalic acid, isophthalic acid, 4,4′-dicarboxydiphenylsulphone, adipic acid and sebacic acid.

5. The process according to claim 1 in which the diisocyanate is selected from the group consisting of meta-phenylene diisocyanate, 4,4′-diisocyanatodiphenylmethane, 2,2-bis-(4-isocyanatophenyl)propane, hexamethylene-1,6 - diisocyanate, bis - (isocyanatocyclohexyl)methane and 3,9-bis-(3-isocyanatopropyl)-2,4,8,10 - tetroxa-(5,5)-spiro-undecane.

6. The process according to claim 1 in which a branching agent is incorporated into the reaction mixture.

7. The process according to claim 6 in which the branching agent is selected from the group consisting of tris-(4-isocyanatophenyl)methane, tris-(4-isocyanatophenyl)phosphate, tris-(4-isocyanatophenyl)thiophosphate and polyisocyanatopolyphenylenepolymethylene.

8. The process according to claim 15 in which the polar liquid is N,N-dimethylformamide, N,N-dimethylacetamide, N-methylpyrrolidone, hexamethylphosphoryltriamide or tetramethylenesulphone.

9. The process according to claim 1 in which the reaction is completed by heating between 120° C. and the boiling point of the solution for a period from 1 to 8 hours.

10. The process according to claim 1 in which the reaction is conducted under reduced pressure.

11. The process according to claim 1 in which the reactants comprise between 10 and 40% by weight of the reaction mixture.

12. The process according to claim 1 in which the viscosity of the reaction medium is maintained below 1,000 poises at the reaction temperature.

13. The process of claim 1 in which the said lower temperature is greater than ambient but below about 80° C.

14. The process of claim 1 in which the polymer produced has an inherent viscosity of at least about 0.26.

15. The process of claim 1 in which the polar liquid is a linear or cyclic amide or phosphoramide or sulphone.

References Cited

UNITED STATES PATENTS

| 2,268,586 | 1/1942 | Gilman | 260—2 |
| 3,392,143 | 7/1968 | Holub | 260—46.5 |
| 3,498,955 | 3/1970 | Morgan et al. | 260—78 |

MORRIS LIEBMAN, Primary Examiner

R. ZAITLEN, Assistant Examiner

U.S. Cl. X.R.

260—32.6 N, 77.5